(12) United States Patent
Pegg

(10) Patent No.: US 8,990,706 B2
(45) Date of Patent: Mar. 24, 2015

(54) SEMANTIC LEVEL GESTURE TOOL TRACKING AND POSITIONING

(75) Inventor: Nigel Pegg, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1883 days.

(21) Appl. No.: 11/936,736

(22) Filed: Nov. 7, 2007

(65) Prior Publication Data

US 2014/0033133 A1    Jan. 30, 2014

(51) Int. Cl.
*G06F 3/00* (2006.01)
*G06F 3/0481* (2013.01)
*H04M 3/56* (2006.01)

(52) U.S. Cl.
CPC ........... *G06F 3/04812* (2013.01); *H04M 3/567* (2013.01)
USPC ........................................................ 715/751

(58) Field of Classification Search
USPC .................. 715/751, 753, 754, 757
See application file for complete search history.

(56) References Cited

U.S. PATENT DOCUMENTS 6,144,991 A * 11/2000 England ........................ 709/205
7,996,776 B2 * 8/2011 Parker et al. .................. 715/753

* cited by examiner

*Primary Examiner* — Thanh Vu
(74) *Attorney, Agent, or Firm* — Shook Hardy & Bacon LLP

(57) ABSTRACT

Various embodiments described herein include one or more of systems, methods, and software operable to identify a location of or position a gesture tool, such as a mouse pointer or cursor, within a web conference display. Some embodiments may communicate an identified location of a gesture tool within a user interface control of a web conference presenter to web conference participants. The communicated location of the gesture tool may cause the gesture tool to be displayed in a corresponding location within a display of a web conference participant despite differences between a view of the presenter and participant. The gesture tool may include a pointer under the control of a mouse, a cursor, or other gesturing tool. Some embodiments include a web conference recording module operable to record data associated with a web conference, including gesture tool positioning data.

18 Claims, 9 Drawing Sheets

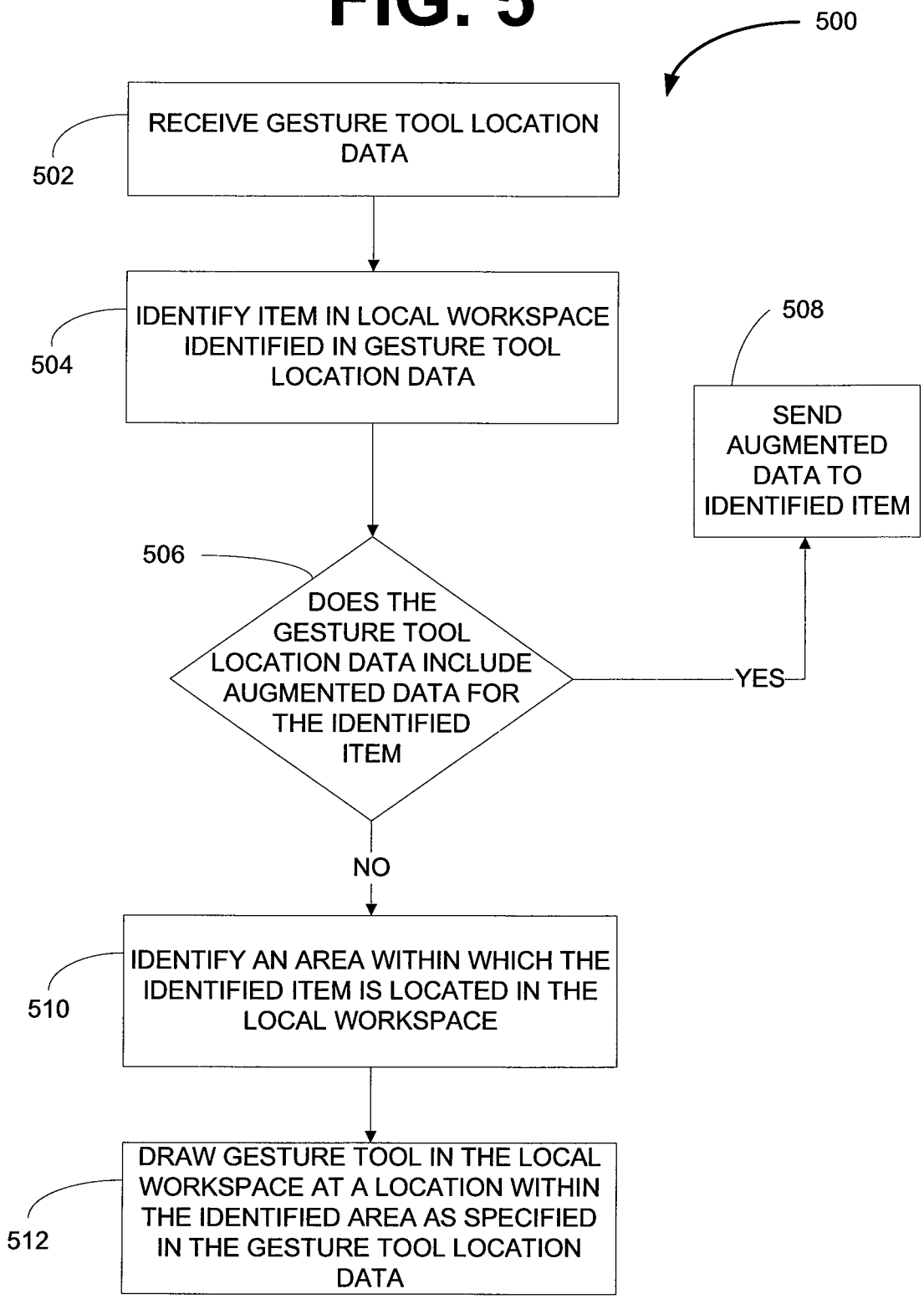

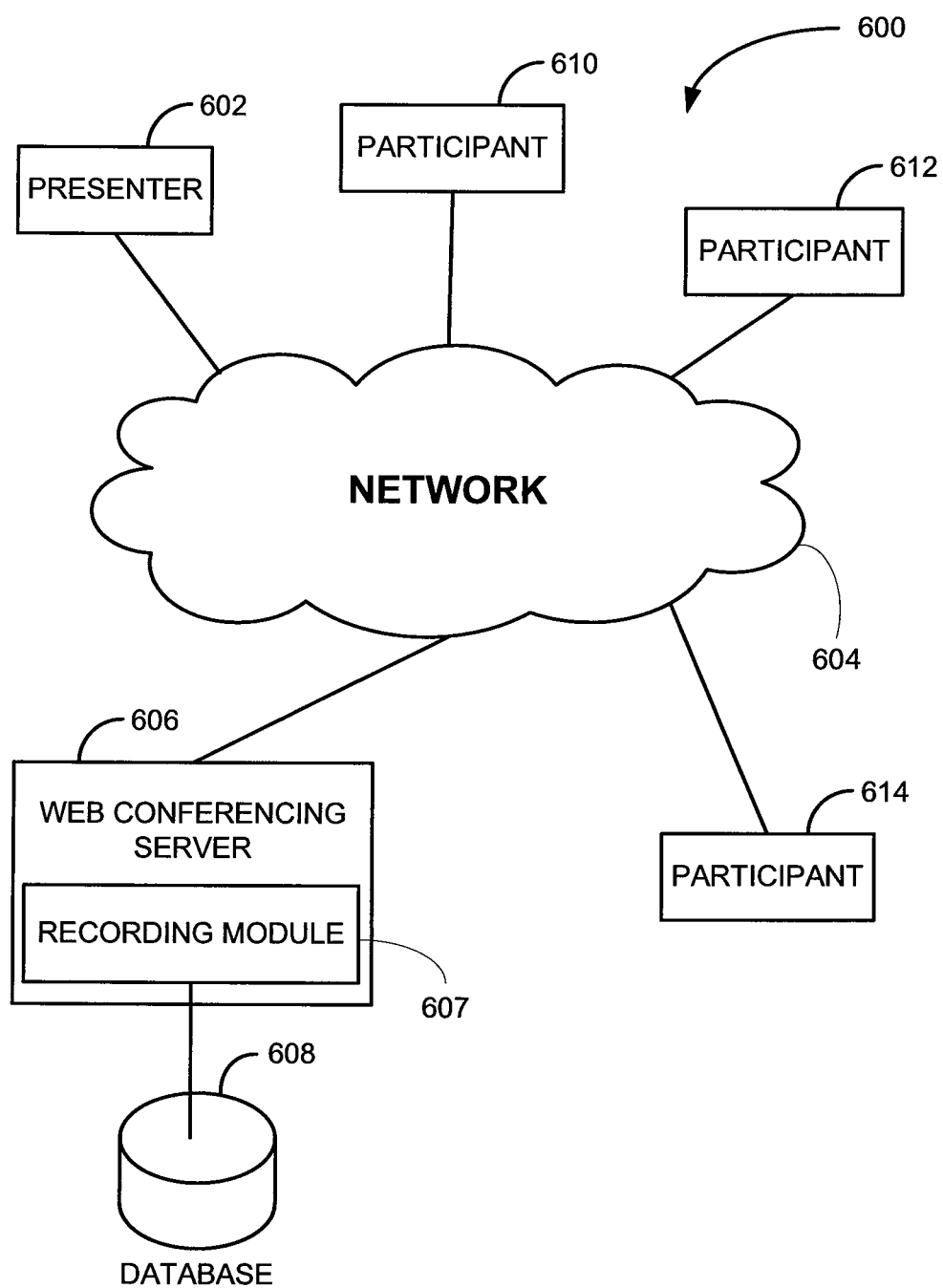

702 — IDENTIFY A LOCATION OF A GESTURE TOOL WITHIN A CONTEXT OF A USER INTERFACE ITEM

704 — TRANSMIT DATA TO AT LEAST ONE WEB CONFERENCE PARTICIPANT INCLUDING DATA REPRESENTATIVE OF THE GESTURE TOOL LOCATION WITHIN THE CONTEXT OF THE USER INTERFACE ITEM.

812 — RECEIVING DATA IDENTIFYING A LOCATION WITHIN A USER INTERFACE ITEM AT WHICH TO DISPLAY A GESTURE TOOL DURING A WEB CONFERENCE

814 — MOVE THE GESTURE TOOL TO THE LOCATION IDENTIFIED IN THE RECEIVED DATA

812 — RECEIVING DATA IDENTIFYING A LOCATION WITHIN A USER INTERFACE ITEM AT WHICH TO DISPLAY A GESTURE TOOL DURING A WEB CONFERENCE

814 — MOVE THE GESTURE TOOL TO THE LOCATION IDENTIFIED IN THE RECEIVED DATA

922 — DETERMINE THE USER INTERFACE ITEM IS NOT CURRENTLY DISPLAYED WITHIN THE WEB CONFERENCE WINDOW CONTROL

924 — SCROLL THE WEB CONFERENCE WINDOW CONTROL TO CAUSE THE USER INTERFACE ITEM TO BE DISPLAYED

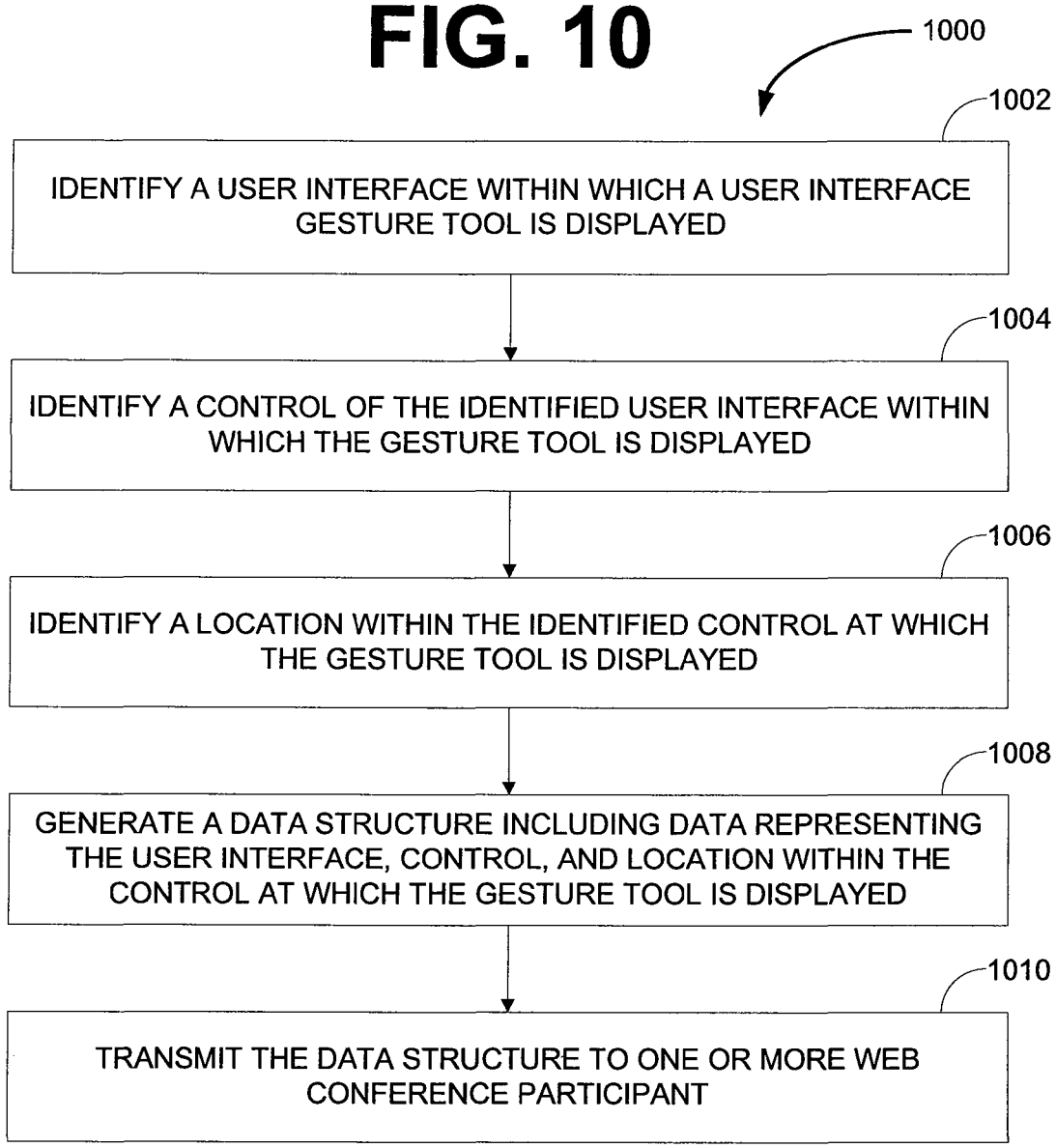

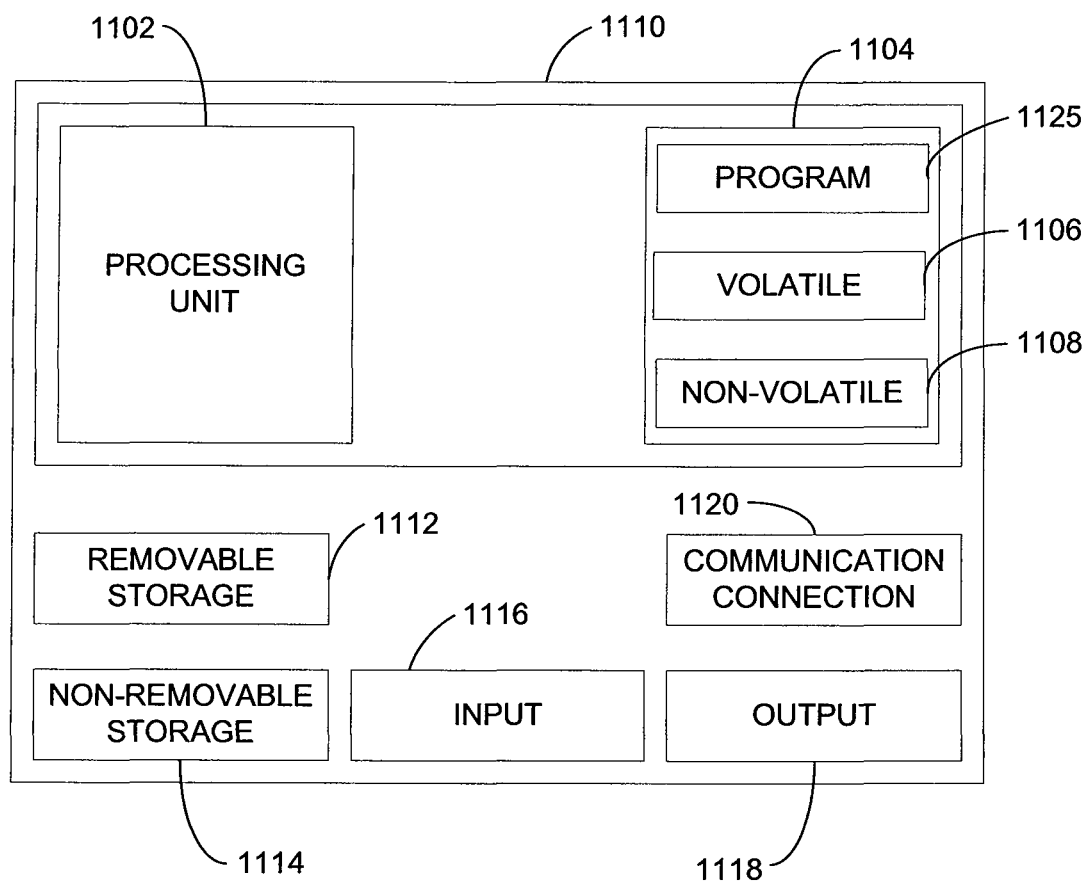

SEMANTIC LEVEL GESTURE TOOL TRACKING AND POSITIONING

BACKGROUND INFORMATION

Use of network hosted conferencing, such as over the Internet, has grown considerably in recent years. There are many products on the market that allow a presenter to share views and audio over a central server with many conference participants. Some of these products may also be used in a collaborative environment, such as between members of a development team. In such instances, control of a computer or computer application on one computer may be shared over a network with other users. Such products offer such functionally in a very similar manner through a server that requires a software client, such as a plug-in or standalone application, on each participant computer. Such client software is often tightly coupled to a server that receives data from one client and distributes the data to other participating clients.

A location of a gesture tool, such as a cursor or pointer, under control of a conference participant is often captured and transmitted to other participants so a position of the gesture tool within the displays of the other participants is essentially an identical location. Gesture tool locations are typically captured and transmitted only by an X and Y pixel or pixel percentage coordinate scheme with regard to an entire shared workspace.

BRIEF DESCRIPTION OF THE DRAWINGS

FIG. 5 is a block flow diagram of a method according to an example embodiment.

FIG. 6 is a system diagram according to an example embodiment.

FIG. 7 is a block flow diagram of a method according to an example embodiment.

FIG. 8 is a block flow diagram of a method according to an example embodiment.

FIG. 9 is a block flow diagram of a method according to an example embodiment.

FIG. 10 is a block flow diagram of a method according to an example embodiment.

FIG. 11 is a block diagram of a computing device according to an example embodiment.

DETAILED DESCRIPTION

Figure 1:
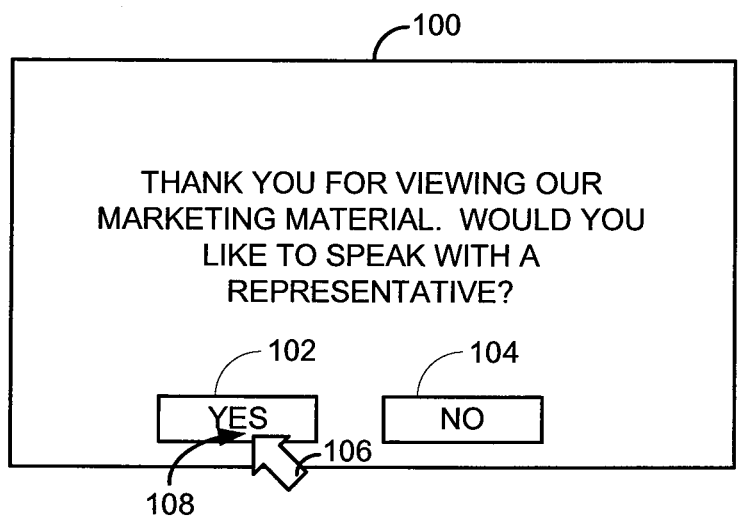
FIG. 1 is an illustration of a user interface according to an example embodiment.

Various embodiments provide one or more of systems, methods, and software operable to identify a location of a gesture tool, such as a pointer, location identifier or cursor, within a display of a web conference presenter. Such embodiments may also communicate an identified location of a gesture tool to web conference participants to cause the gesture tool to be displayed in a corresponding location within a display of a web conference participant. Identifying the location of the gesture tool in some embodiments includes identifying a location of the gesture tool in the context of a shared application. In an example embodiment, identifying the contextual location of a gesture tool may include identifying and specifying the location of the gesture tool relative to other objects, icons or display components of a user interface of the shared application.

Identifying the location of the gesture tool in the context of a shared application may include identifying a pointer position within a control, such as a control button, within the user interface of a shared application. The location may be represented in a form such as:

APPLICATION.CONTROL.LOCATION

Where:

APPLICATION=data identifying a user interface of an application

CONTROL=data identifying a control within the application user interface

LOCATION=a location identifier, such as a set of X and Y axis coordinates within the control, the coordinates indicating a position relative to the control.

Web conference participants often display a shared view of a web conference on a monitor of a different size and/or different resolution than the presenter. Further, web conference participants may resize, reposition, and even scroll user interface controls shared by the presenter. As a result, gesture tool positions may not be accurately reflected, or even displayed, using a simple X and Y coordinate in the context of an entire shared workspace. Various embodiments that identify the gesture tool location in the context of a shared application allow participant systems to compensate for such differences between the views shared by a presenter and the view displayed to the participant. These and other embodiments are described in detail below.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the example process flow is applicable to software, firmware, and hardware implementations.

FIG. 1 is an illustration of a user interface 100 according to an example embodiment. The user interface 100 is an example of an application user interface that may be shared by a web conference presenter with web conference participants. The user interface includes control buttons 102 and 104 which may be selected using pointer 106. The position of the pointer is at point 108.

In some embodiments, a process of a presenter web conferencing application tracks the position of the pointer 106 with regard to (e.g., relative to) controls within the user interface 100. For example, such a process may identify that the pointer 106 is located within the "YES" control button 102 at position 108. The position 108 may be represented within the "YES" control button 102 in any number of ways, such as an X-axis and Y-axis coordinate or height and width ratio within the "YES" control button. Some embodiments may include a user interface in addition to the illustrated user interface 100. In such embodiments, the location 108 of the pointer 106 may be tracked in the context of a user interface, a control within the user interface, and a location with the control. FIG. 2-FIG. 5 are described below and provide further detail of user interface context tracking of gesture tools within a workspace of a presenter and positioning of the gesture tool within participant workspaces.

Figure 2:
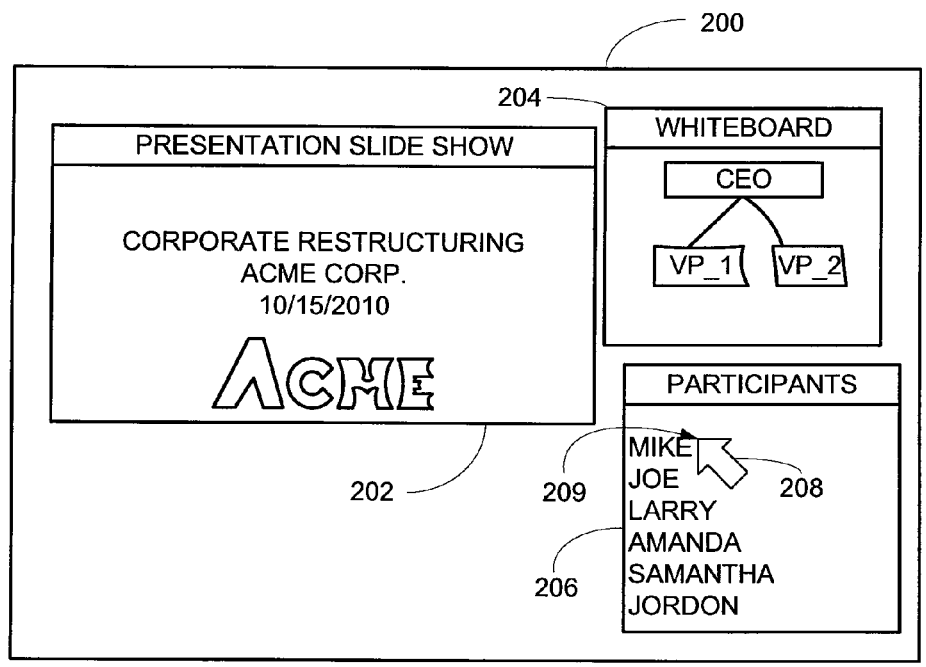
FIG. 2 is an illustration of a user interface according to an example embodiment.

FIG. 2 is an illustration of a user interface 200 according to an example embodiment. The user interface 200 is an example of a workspace view, such as a desktop view, of a web conference presenter. The presenter user interface 200 includes a presentation slide show window 202, a whiteboard tool window 204, and a participants list window 206. Each of these windows 202, 204, 206 are shared by the presenter with web conferencing participants.

The presenter user interface 200 further includes a pointer 208 at a location 209. In some embodiments, a web conferencing application may identify the location 209 of the pointer 208, or other gesture tool such as a cursor, within the context of the participants list window 206. For example, the location 209 of the pointer 208 may be determined relative to the outer boundaries, a corner or a center-point of the participants list window 206. Some embodiments may also include identifying the location 209 of the pointer 208 with further regard to (e.g., relative to) an item within the participants list window 206, such as a control or data item. For example, the location of the pointer 208 may be identified as pointing to the data item "MIKE' displayed within the participants list window 206.

In some embodiments, the participants list window 206 is part of the web conferencing application. In other embodiments, the application of the participants list window 206 is enabled to communicate with the web conferencing application via an application programming interface or other interface. In further embodiments, the participants list window 206 may be an application enabled to communicate directly with a web conferencing server to share a view of a user interface of the application, such as the participants list window 206.

Returning now to the identification of the pointer 208 position 209 with regard to the data item "MIKE," the application of the participants list window 206 may be enabled to report or otherwise provide the position 219 of the pointer 218 to the web conferencing application. The position 219 of the pointer 218 may be provided with regard to (e.g., expressed in information providing a location relative to objects or components of) the participants list window 206, the portion of the participants list window 206 within which the list of participants is provided, and the record of data item "MIKE." In some embodiments, a web conferencing application may obtain the location information from the application of the participants list window 206 through an application programming interface call or via other methods capable of providing the necessary information. An examples of such a method capable of providing the necessary information is illustrated and described below with regard to FIG. 3.

This location data may then be communicated over a network to web conference participants and the pointer within participant user views may be moved to the proper data record of the corresponding participants list window. This functionality may be useful in several scenarios such as if a participant is viewing the participants list window 206 at a different resolution, at a different size, or even if the data items within a participants view of the participants list window is sorted differently. In such instances, the data items in the participants list window of the participant may be scrolled to allow the pointer to be displayed at a corresponding position with regard to the "MIKE" data item. An example of such a web conference participant user interface is provided in FIG. 4.

Figure 3:
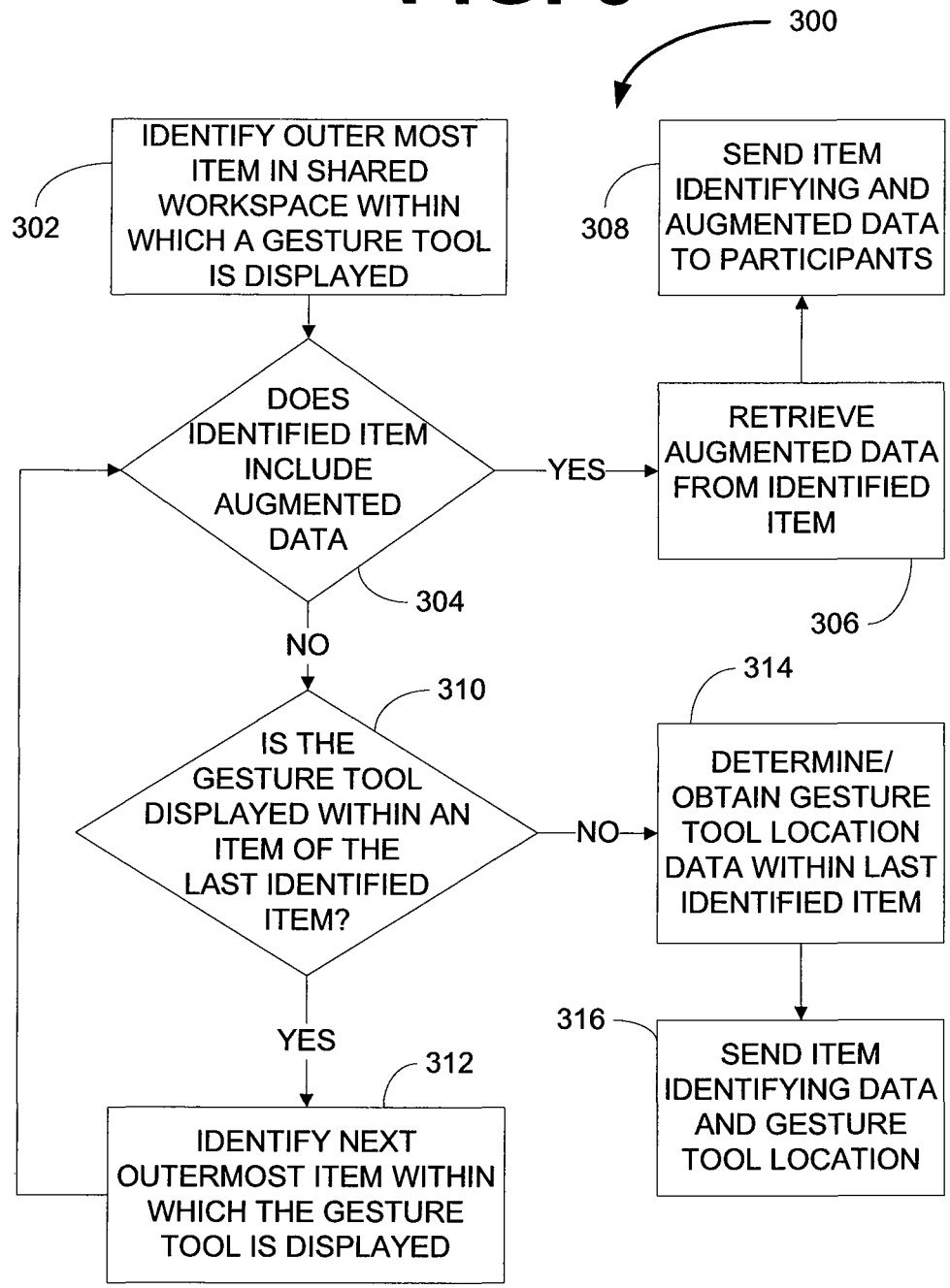
FIG. 3 is a block flow diagram of a method according to an example embodiment.

FIG. 3 is a block flow diagram of a method 300 according to an example embodiment. The method 300 is an example of a method that may be performed by a web conferencing application on a computing device of a web conference presenter. The method 300 is operative to identify a location of a pointer on the presenter's computing device in the context of items displayed in a workspace shared with web conferencing participants.

The example method 300, in some embodiments, includes identifying 302 an outer most item in the shared workspace within which the gesture tool of interest in displayed. As mentioned above, the gesture tool may be a pointer, such as a pointer under control of a pointing device, such as a mouse. Other gesture tools are contemplated and relevant to the subject matter herein, such as a cursor. The identifying 302 of the outer most item in the shared workspace within which a gesture tool is displayed may be identified by requesting a display coordinate position of the gesture tool from an operating system on the presenter's computing device. The coordinates may then be provided back to the operating system via an application programming interface call that provides a reference, or other handle, that uniquely identifies the window or other user interface item of the coordinates. In a Microsoft Windows computing environment, such an application programming interface call may include the WindowFromPoint function of the CWnd class of the Microsoft Foundation Class or WinForms.

The identifying 302 of the outermost item in the shared workspace within which the gesture tool is displayed results in obtaining an identifier of the outer most window, or other item, within which the gesture tool is located. The method 300 then determines 304 if the identified item includes augmented data. Augmented data may be included in and provided by a window or control to be provided when requested by a web conferencing presenter application performing the method 300. In some embodiments, the augmented data may be provided by a window or control of a collaboration-enabled application. The augmented data, in some embodiments, includes data about how the identified item is displayed. This augmented data may include positioning data of where the gesture tool is located, data identifying how the item is displayed, such as a sort order of records and a displayed record. In some embodiments, such as when the identified item is a data window, the augmented data may identify a sort order of records in the data window and a record over which the gesture tool is located. This augmented data may be provided to web conference participants and will cause a corresponding item displayed to a participant to conform the item to the augmented data and move the gesture tool to the location identified in the augmented data, such as over an identified data record.

If the method 300 determines 304 that the identified item does include augmented data, the method 300 retrieves 306 the augmented data from the identified item and sends 308 data identifying the identified item and the augmented data to web conferencing participants. If the method 300 determines 304 that the identified item does not include augmented data, the method 300 determines 310 if the gesture tool is displayed within an item of the last identified item.

Note that the method 300 as illustrated in FIG. 3 provides the possibility for looping when identifying items. Thus, at the first time through the loop, the last identified item is the outer most identified 302 item. In subsequent iterations through the loop the last identified item may be an item embedded within the identified 302 outer most item, such as a control button, drop-down list box, or data window within a larger window.

The determination 310 if the gesture tool is displayed within an item of the last identified item, in some embodiments, includes querying a display list of an application of the last identified item, such as an operating system or other application of the last identified item. Most modern computing applications maintain a representation of items displayed within a user interface in a data structure commonly referred to as a display list. Data within a display list identifies items displayed in such as user interface and where such items are displayed. Some display lists are maintained in a hierarchical nature such that the data may include a representation of a control within a child window within a parent window. Thus, an application display list may be queried repetitively, such as through the looping portion of the method 300, to identify a lowest level item, such as a control, within which the gesture tool of interest is located. Such applications including display lists usually include an application programming interface that may be utilized to query the display list. Applications created using the Microsoft Foundation Class may be queried using Microsoft Foundation Class function calls, as discussed above. Other applications may constructed using other common application programming interfaces. For example, all, or most, applications developed by a company may be compliant with a single application programming interface. Thus, the web conferencing application on a presenter's computing device may include the ability to not only identify an application within which a gesture tool is located, but also identify the specific application to allow a determination of which application programming interface calls may be used to communicate with the application. In some embodiments, the web conferencing application may also, or alternatively, include an application programming interface standard that other applications may be developed to conform to facilitate web conferencing.

If the determination 310 is that the gesture tool is displayed within an item of the last identified item, the method 300 includes identifying 312 a next outermost item within which the gesture tool is displayed. This further identifying, as discussed above, may include querying a display list of an application within which the gesture tool is located. The identifying 312 of the next outermost item in the shared workspace within which the gesture tool is displayed results in obtaining an identifier of the next outer most item. This reference is then used to once again determine 304 if the identified item includes augmented data. The method 300 then proceeds as discussed above.

If the determination 310 is that the gesture tool is not displayed within an item of the last identified item, such as when the method 300 has identified the item at the lowest level of a display list hierarchy, the method determines or obtains 314 gesture tool location data within the last identified item. In some embodiments, determining the gesture tool location data may be performed by converting the actual location of the gesture tool within the overall workspace, obtained above, into a coordinate space of the lowest level item. In some embodiments, obtaining the gesture tool location data may include calling a function that may be available within an application programming interface of the last identified item or an application of the last identified items. The method 300 then sends 316 item identifying data and gesture tool location data to the web conference participants.

Figure 4:
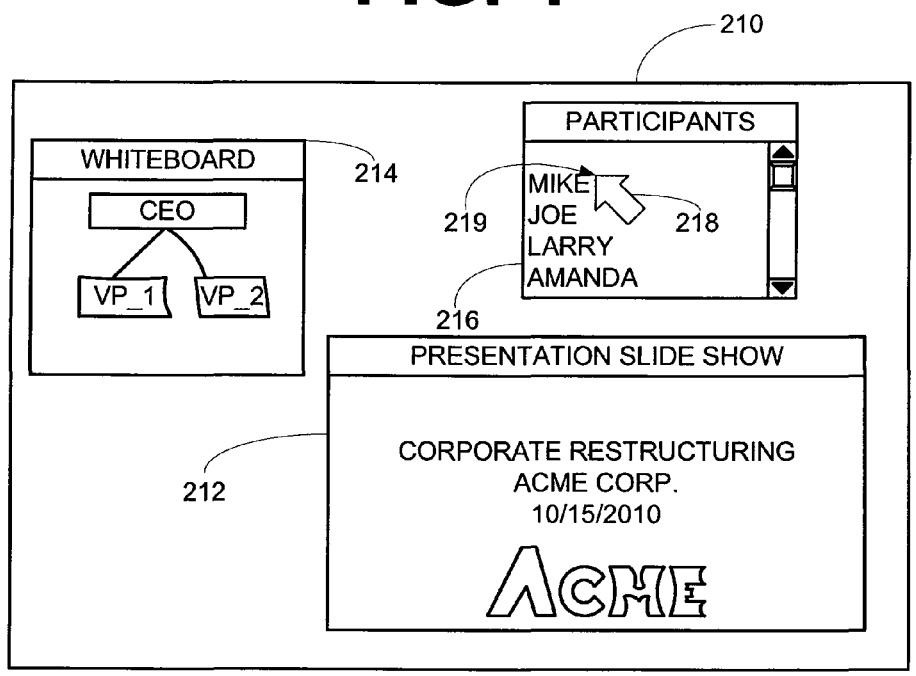
FIG. 4 is an illustration of a user interface according to an example embodiment.

FIG. 4 is an illustration of a user interface 210 according to an example embodiment. The user interface 210 is an example of a web conference participant user interface when participating in a web conference presented by a user of the presenter user interface 200 illustrated and described with regard to FIG. 2.

The participant user interface 210 includes a presentation slide show window 212, a whiteboard tool window 214, and a participants list window 216. These windows 212, 214, 216 correspond to and display the content of the windows 202, 204, 206 shared by the presenter as illustrated and described with regard to FIG. 2. In some embodiments, the windows 212, 214, 216 may be rearranged and resized within the participant user interface 210 as the participant desires. Resizing of the window 212, 214, 216 may cause portions of the windows 202, 204, and 206 shared by the presenter to be hidden. For example, looking at the participants list window 216, which has been relocated and resized, compared to the participants list window 206 of FIG. 2, it can be seen that the data items "SAMANTHA" and "JORDAN" are scrolled out of view in the window 216. In addition, the participant user interface 210 may be displayed to a participant at a different resolution, at a different aspect ratio (e.g., 4×3, 16×9, etc.), and at a different size.

Conversion of shared views between resolutions, aspect ratios, and sizes is outside the scope of the present application, but handling of gesture tool positioning between such differing views is within the scope. Gesture tool positioning, such as positioning of pointer 218 or a cursor, is handled in some embodiments by receiving gesture tool positioning data from a presenter in the context of an application window, such as the windows 212, 214, and 216. In such embodiments, a window may be identified in the gesture tool positioning data, such as by a reference to the participants list window 216. The gesture tool positioning data may also reference a position within the window, such as by an X and Y pixel coordinate position or by X and Y ratios (such as 20 percent across the X-axis and 75 percent up the Y-axis). In other embodiments, the gesture tool positioning data may also identify a control within a window, such as the control in the participants list window 216 listing the participants. In such embodiments, a location within the identified control may also be provided in the gesture tool positioning data. Such a location may be X and Y positioning data as mentioned above or with reference to a data item in the control, such as through use of contextual augmented data. For example, the gesture tool positioning data may identify a data item, such as the "MIKE" data item in the participants list window 216. The gesture tool, such as pointer may then be moved to the location 219 identified in the gesture tool positioning data. Note that the position 219 of the pointer 218 corresponds to the position 209 of the pointer 208 in the participants list window 206 of FIG. 2. These positions 209, 219 correspond with one another even though the corresponding participant list windows 206, 216 are sized and scrolled differently and may even be displayed at different aspect ratios, different sizes, and different resolutions.

In some embodiments, the participant's display may be a multilayered display. One layer may be a standard layer and another layer an overlay layer. Such multilayered displays may be generated through use of one or both of operating system functions and a graphic output circuit, such as a graphics card. Typically, a standard layer is the layer within which most common computing applications, such as word processing programs, slide presentation programs, and the like, are displayed. In some embodiments, a shared workspace view received from a web conference presenter is displayed in the standard layer and one or more gesture tool representations positioned and generated based on data received from the web conference presenter may be displayed in the overlay layer.

In some embodiments, if the gesture tool positioning data received by the participant from the presenter, such as augmented data, identifies a location not currently displayed in the participant user interface 210, the participant web conferencing application may cause the participant user interface 210 or one of the windows 212, 214, 216 to display the location to allow the gesture tool to be visible. For example, if the gesture tool positioning data received by the participant identifies the "JORDAN" data item in the participant list window 216, the web conferencing application of the participant may cause the participant list window 216 to scroll in a direction to cause the "JORDAN" data item to become visible. The pointer may then be positioned with regard to the "JORDAN" data item.

FIG. 5 is a block flow diagram of a method 500 according to an example embodiment.

The method 500 is an example of a method that may be performed by a web conferencing application on a computing device of a web conference participant that receives web conference data over a network that originates with a web conference presenter. The method 500 includes receiving 502 gesture location data. In some embodiments, the gesture tool location data may have been created and sent according to the method 300 of FIG. 3 as described above.

In some embodiments, the gesture tool location data identifies an item within which to display the gesture tool and a location within the item. For example, the gesture tool location data may identify a window, a control within the window, and even a control within the control. The gesture tool location data may also include further data, such as X and Y coordinates within an identified item of where to display the gesture tool. The X and Y coordinates may be actual coordinates or other data that may be used to identified actual coordinates, such as coordinate ratios. In some embodiments, the gesture tool location data may also include augmented data, as described above. The augmented data has meaning to the lowest level item identified as discussed above (i.e., the control within the control of the window). The augmented data may cause an item, such as a control, to behave in a certain fashion, such as sorting data records, making a data record visible that is currently scrolled out of view in the workspace display of the web conference participant, or other action. The augmented data, when received and processed by an identified item, may also cause the participant's web conferencing application to move the gesture tool in the overlay pane to a location within the item, such as on top of a data record brought into view. Moving of the gesture tool may include redrawing a gesture tool representation in an overlay pane of the participant's display.

In some embodiments, the method 500 processes the gesture tool location data by identifying 504 an item in a local workspace, such as a display, identified in the gesture tool location data. For example, if the gesture tool location data is in the format of WINDOW.CONTROL.CONTROL.(DATA), where the DATA may be X and Y coordinates, X and Y coordinate ratios, or augmented data, the identifying 504 may include querying operating system and/or application display lists as discussed above with regard to FIG. 3. However, rather than identifying items with regard to coordinates, the identifying 504 identifies items by reference to item identifiers, such as application and control identifiers. By identifying items in display lists, locations and handles of the items within the participant's display may be obtained. The locations may be used to determine where to draw a gesture tool in the overlay pane. A handle to an item may be used to pass augmented data.

Once the item is identified 504 based on the gesture tool location data, the method 500 includes determining 506 if the gesture tool location data includes augmented data for the identified item. If the gesture tool location data does include augmented data, the method 500 sends 508 the augmented data to the identified item. The identified item then processes the augmented data to cause the gesture tool to be relocated and/or to cause the identified item to perform some other function, such as brining an item into view by scrolling or moving the gesture tool over a specific data record.

If the gesture tool location data does not include augmented data, the method 500 includes identifying 510 an area within which the identified item is located in the local workspace. The area identification 510 may include querying item display lists as discussed above to locate an area where the item is displayed. Once this area is identified 510, the method 500 includes drawing 512 the gesture tool in the local workspace at a location within the identified area as specified in the gesture tool location data.

FIG. 6 is a system 600 diagram according to an example embodiment. The system 600 illustrates a typical networked environment within which web conferencing may be conducted. The system 600 may include a presenter computing device 602 connected to a network 604. The network 604, in some embodiments, may include one or more of a local area network, a wide area network, the Internet, a virtual private network, a dedicated web conferencing network, or other network suitable for carrying web conference data between presenters and participants. The presenter computing device 602 may transmit web conference data to a web conferencing server 606 or directly to one or more participant computing devices 610, 612, 614 over the network 604. In embodiments utilizing the web conferencing server 606, the web conferencing server 606 may receive the web conference data from the presenter computer device 602 over the network and broadcast the web conferencing data to each participant computing device 612 participating in the web conference.

In some embodiments, the web conferencing server 606 may include a recording module 607 to record web conferencing data. In some such embodiments, the recording module 607 records not only shared views, but also gesture tool positioning data. The recording module 607 may store the recorded data in a data storage device, such as a hard drive, in a database 608, or in another location or on another device suitable to store such data. In some further embodiments, the web conferencing server 606 is operable to receive and fulfill requests for web conferences recorded by the recording module 607.

FIG. 7 is a block flow diagram of a method 700 according to an example embodiment. The method 700 is a method of identifying a location of a gesture tool, such as a pointer or cursor, within a user interface shared by a web conference presenter. In some embodiments, the method 700 includes identifying 702 a location of a gesture tool within a context of a user interface item and transmitting 704 data to at least one web conference participant including data representative of the gesture tool location within the context of the user interface item. The gesture tool may be a pointer under the control of a pointing device, such as a mouse, touch pad, pen of a pen based computing device, or other pointing device coupled to a computing device performing the method 700. As discussed above, the user interface item may be a window, a control within a window, or event a data item within a control.

FIG. 8 is a block flow diagram of a method 810 according to an example embodiment. The method 810 is a method of positioning a gesture tool within a user interface of a web conference participant. The method 810 typically includes receiving 812 data identifying a location within a user interface item at which to display a gesture tool during a web conference. The method 810 may also include moving 814 the gesture tool to the location identified in the received data. In some embodiments, the data identifying the location within the user interface item at which to display the gesture tool includes data identifying a web conference window and a control within the web conference window within which the user interface item is included. In such embodiments, the user interface item may include a data item, a control within a control, or other item.

FIG. 9 is a block flow diagram of a method 920 according to a further example embodiment. The method 920 is a method of not only positioning a gesture tool, but also modifying a participant view of a web conference to allow proper positioning of the gesture tool. The method 920 includes the receiving 812 of data identifying the location within the user interface item at which to display the gesture tool during the web conference and the moving 814 of the gesture tool to the location identified in the received data as in the method 810 of FIG. 8. However, the method 920 further includes determining 922 the user interface item is not currently displayed within the web conference window control of a participant and scrolling 924 the web conference window control of the participant to cause the user interface item to be displayed.

FIG. 10 is a block flow diagram of a method 1000 according to an example embodiment. The method 1000 is another method of identifying a location of a gesture tool, such as a pointer or cursor, within a user interface shared by a web conference presenter. The method 1000 includes identifying 1002 a user interface within which a user interface gesture tool is displayed, identifying 1004 a control of the identified user interface within which the gesture tool is displayed, and identifying 1006 a location relative to the identified control at which the gesture tool is displayed. The relative location of the gesture tool could, for example, be within the boundaries of the identified control, or at some other location external to the identified control. Once the location has been identified, the method 1000 includes generating 1008 a data structure including data representing the user interface, control in the user interface, and location within the control at which the gesture tool is displayed. The data structure may then be transmitted 1010 to one or more web conference participants. Transmitting 1010 the data structure to one or more web conference participants may include transmitting the data structure to a web conferencing server, such as the web conferencing server 607 of FIG. 6.

FIG. 11 is a block diagram of a computing device according to an example embodiment. In one embodiment, multiple such computer systems are utilized in a distributed network to implement multiple components in a web conferencing environment, such as in the illustrated system 600 of FIG. 6. An object oriented, service oriented, or other architecture may be used to implement such functions and communicate between the multiple systems and components. One example computing device in the form of a computer 1110 may include a processing unit 1102, memory 1104, removable storage 1112, and non-removable storage 1114. Memory 1104 may include volatile memory 1106 and non-volatile memory 1108. Computer 1110 may include—or have access to a computing environment that includes—a variety of computer-readable media, such as volatile memory 1106 and non-volatile memory 1108, removable storage 1112 and non-removable storage 1114. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1110 may include or have access to a computing environment that includes input 1116, output 1118, and a communication connection 1120. The input 1116 may include a pointing device such as a mouse. The output 1118 typically includes a monitor. The computer may operate in a networked environment using a communication connection 1120 to connect to one or more remote computers, such as one or more computers of web conference participants, a web conferencing server, a web conference recording server, or other such remote computers. The remote computer may include a personal computer (PC), server, router, network PC, a peer device or other common network node, or the like. The communication connection 1120 may include one or more connections to one or more of a Local Area Network (LAN), a Wide Area Network (WAN), the Internet, and other networks.

Computer-readable instructions stored on a computer-readable medium are executable by the processing unit 1102 of the computer 1110. A hard drive, CD-ROM, and RAM are some examples of articles including a computer-readable medium. For example, the computer program 1125 may include one or more of a web conferencing program, a slide presentation or word processing program such as the PowerPoint and Word applications available from Microsoft Corporation of Redmond, Wash., and web conferencing enabled applications.

In some embodiments, a web conference may include sharing of a document authoring or viewing application. In some such embodiments, the gesture tool positioning data may identify a location with regard to a page and/or character position in a document being viewed.

Some additional embodiments provide systems including a network interface, a storage device, and a web conference recording module. The web conference recording module may be operable to receive web conference data over the network interface including data representative of one or more user interfaces and data identifying one of the one or more user interfaces and a location within that user interface at which to display a gesture tool. The web conference recording module may be further operable to store the web conference data in the storage device as a recording of the web conference from which the data is received.

A system including a web conference recording module, or other system, may include a web conference transmission module to serve recorded web conferences to requesting participants. Such web conference transmission modules are typically operable to retrieve data of a recorded web conference from the storage device and transmit the retrieved data to one or more recorded web conference participants over the network interface.

Other embodiments may include a computer readable medium, such as a removable disk, a memory stick, a networked data storage device, or other medium. The computer readable medium may hold an instruction set, such as software, operable on a computer to cause the computer to receive a data structure including data identifying a user interface displayed during a web conference, a control within the user interface, and location within the control at which to display a gesture tool and to move the gesture tool to the location identified in the received data structure. Other computer-readable medium may hold instructions sets operable to perform one or more of the methods described herein.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
identifying gesture tool location data that identifies a location of a gesture tool within a context of, and relative to a component of, a user interface, the gesture tool location data identifying each of an application of a control, the control within the application, and a coordinate location relative to the control of the application, wherein the control is an item of content within the application; and
transmitting, to at least one web conference participant, the gesture tool location data relative to the user interface component and within the context of the user interface.

2. The method of claim 1, wherein the gesture tool is a pointer under the control of a pointing device coupled to a computing device performing the method.

3. A method comprising:
receiving gesture tool location data identifying a location of a gesture tool within a user interface during a web conference, the location of the gesture tool being expressed relative to a user interface component of the user interface, the gesture tool location data identifying each of an application of a content item, the content item being within the application, and a coordinate location relative to the content item within the application; and
displaying the gesture tool at the location identified in the gesture tool location data.

4. The method of claim 3, wherein the gesture tool is a pointer.

5. The method of claim 3, wherein the gesture tool location data identifying the location at which to display the gesture tool includes data identifying a web conference window and the content item within the web conference window.

6. The method of claim 5, further comprising:
determining the user interface component is not currently displayed within the web conference window control; and
scrolling the web conference window control to cause the user interface component to be displayed.

7. A system comprising:
a network interface;
a storage device; and
a web conference recording module operable to:
receive web conference data over the network interface including data representative of one or more user interfaces and data identifying a first user interface of the one or more user interfaces and gesture tool location data that identifies a location within the first user interface at which to display a gesture tool, the gesture tool location data identifying each of the first user interface within which to display the gesture tool, a control within the first user interface within which to display the gesture tool, and a position within the control of the first user interface at which to display the gesture tool, wherein the control is a content item within the first user interface; and
store the web conference data in the storage device as a recording of the web conference from which the data is received.

8. The system of claim 7, further comprising:
a web conference transmission module operable to:
retrieve data of a recorded web conference from the storage device; and
transmit the retrieved data to one or more recorded web conference participants over the network interface.

9. The system of claim 7, wherein the gesture tool is a graphical element within a user interface under control of a web conference presenter.

10. The system of claim 9, wherein the gesture tool is a cursor.

11. A non-transitory computer-readable medium, with instructions thereon, which when processed, cause a computer to:
identify a content item of a user interface within which the gesture tool is displayed;
determining a location at which the gesture tool is displayed relative to the content item of the user interface;

generate a data structure including gesture tool location data representing the user interface within which the gesture tool is displayed, the content item within the user interface, and a coordinate location at which the gesture tool is displayed relative to the content item; and transmit the data structure to one or more web conference participants.

12. The non-transitory computer-readable medium of claim 11, wherein transmitting the data structure to one or more web conference participants includes transmitting the data structure to a web conferencing server.

13. The non-transitory computer-readable medium of claim 11, wherein the gesture tool is a pointer under control of a pointing device coupled to the computer.

14. A non-transitory computer-readable medium, with instructions thereon, which when processed, cause a computer to:

receive a data structure including gesture tool location data identifying a location of a gesture tool and identifying each of a user interface displayed during a web conference, a control within the user interface, and a coordinate location within the control of the user interface at which to display the gesture tool, wherein the control is a content item within the user interface; and move the gesture tool to the location of the gesture tool identified in the received data structure based on each of the identified user interface, the control within the user interface, and the coordinate location within the control of the user interface.

15. The non-transitory computer-readable medium of claim 14, wherein the data structure data identifying the control within the user interface identifies a control including data items.

16. The non-transitory computer-readable medium of claim 15, wherein the data structure data identifying the location within the control at which to display the gesture tool identifies a data item displayed within the control.

17. The non-transitory computer-readable medium of claim 14, wherein the data structure data identifying the control within the user interface identifies a scrollable control.

18. The non-transitory computer-readable medium of claim 17, with further instructions thereon, which when processed, causes the computer to:

determine the coordinate location within the control identified in the data structure data at which to display the gesture tool is scrolled out of view within the identified scrollable control; and scroll the scrollable user interface control to cause the coordinate location identified within the data structure data to be displayed.

* * * * *